(12) United States Patent
Kumar et al.

(10) Patent No.: US 6,781,808 B2
(45) Date of Patent: Aug. 24, 2004

(54) METHOD FOR DETECTING ELECTRICAL FAULTY CONDITIONS IN POWER DEVICES OF A PROPULSION SYSTEM

(75) Inventors: Ajith K. Kumar, Erie, PA (US); Jeremy McGarry, Erie, PA (US)

(73) Assignee: General Electric Company

( * ) Notice: Subject to any disclaimer, the term of this patent is extended or adjusted under 35 U.S.C. 154(b) by 502 days.

(21) Appl. No.: 09/828,382

(22) Filed: Apr. 6, 2001

(65) Prior Publication Data

US 2002/0145842 A1 Oct. 10, 2002

(51) Int. Cl.⁷ .................................................. H02H 9/08
(52) U.S. Cl. ..................................... 361/93.9; 361/93.8
(58) Field of Search ........................... 361/93.9, 42, 33, 361/93.8, 221; 324/509, 771, 537, 519, 522, 772; 307/9.1; 192/2; 104/287, 288

(56) References Cited

U.S. PATENT DOCUMENTS

| | | | |
|---|---|---|---|
| 3,852,656 A | 12/1974 | Bourbeau | |
| 4,384,248 A | 5/1983 | Matsuda et al. | |
| 4,400,626 A | 8/1983 | Lacy | |
| 4,633,241 A | 12/1986 | Casteel et al. | |
| 4,675,799 A | 6/1987 | Suzuki et al. | |
| 4,745,513 A | 5/1988 | McMurray | |
| 4,843,533 A | 6/1989 | Roof et al. | |
| 4,908,756 A | 3/1990 | Higashino | |
| 4,926,306 A | 5/1990 | Ueda et al. | |
| 4,953,069 A | 8/1990 | Braun et al. | |
| 5,099,410 A | 3/1992 | Divan | |
| 5,266,891 A | 11/1993 | Kumar et al. | |
| 5,363,039 A * | 11/1994 | Kumar et al. | 324/158.1 |
| 5,428,523 A | 6/1995 | McDonnal | |
| 5,491,622 A | 2/1996 | Carosa | |
| 5,892,342 A * | 4/1999 | Friedlander et al. | 318/434 |
| 6,100,660 A * | 8/2000 | Ikeyama et al. | 318/473 |

* cited by examiner

Primary Examiner—Brian Sircus
Assistant Examiner—James A Demakis
(74) Attorney, Agent, or Firm—Carl Rowold, Esq.; Enrique J. Mora, Esq.; Beusse Brownlee Wolter Mora & Maire, P.A.

(57) ABSTRACT

A method for detecting electrical faulty conditions in a plurality of power devices of a propulsion system is provided. The plurality of power devices is connectable in parallel circuit through a direct current (DC) link to an external DC power source. The method provides a first sequence of actions for determining an electrical short condition in at least one of the power devices upon the power source being connected. The method further provides a second sequence of actions for determining an electrical open condition in a respective one of the plurality of power devices during the occurrence of high current events.

9 Claims, 4 Drawing Sheets

US 6,781,808 B2

METHOD FOR DETECTING ELECTRICAL FAULTY CONDITIONS IN POWER DEVICES OF A PROPULSION SYSTEM

BACKGROUND OF THE INVENTION

The present invention is generally related to detection of faulty conditions, and, more particularly, to a method for detecting electrical faulty conditions in power devices, such as solid state rectifiers, used in a propulsion system.

Vehicles that include an electrically-powered propulsion system typically use power devices, such as silicone-controlled rectifiers (SCRs), also known as thyristors, or other solid state devices, to connect a direct current (DC) power source to a DC power line filter. For vehicles that are operable on railroad tracts, e.g., locomotives and transit vehicles, the power source may be an external power source, e.g., a power rail, an onboard power source, e.g., an alternator driven by an internal combustion engine, or both, in a dual mode locomotive. The filtered power is used by traction inverters and other systems in the vehicle for driving traction motors and other electrical loads like blowers, fans, etc. In view of the relatively large power ratings of such systems, a single SCR may not be sufficient to carry the full power and multiple SCRs are generally connected in parallel to share the load. For example, in one exemplary dual mode locomotive there may be five or more SCRs connected in parallel during power rail operation. It will be appreciated that as the number of SCRs increases, the probability of any one of such power devices failing also increases. It is thus desirable to be able to provide techniques that quickly and reliably detect when respective ones of such power devices fail, such as may occur either in an electrically shorted condition or in an electrically open condition. This allows the operator of the vehicle to proactively arrange for repair and/or maintenance services that prevent potentially costly collateral damage to other components of the propulsion system.

SUMMARY OF THE INVENTION

Generally, the present invention fulfills the foregoing needs by providing in one aspect thereof, a method for detecting faults indicative of an electrical short condition in at least one power device of a propulsion system. The power device is connectable to an external direct current power source. Upon the power source being connected, the method allows to measure an initial voltage across a power line filter. Based on whether the initial voltage measurement is less than a predefined voltage threshold, the method allows to measure voltage developed across the line filter upon waiting a time interval. The method allows to determines the presence of the electrical short condition based on whether the magnitude of the voltage developed across the line filter rises to about power line voltage within the time interval, wherein the time interval is sufficiently short to avoid damage to the propulsion system and further wherein the time interval is sufficiently long relative to the time constant of the filter to enable said voltage to rise to about line voltage.

The present invention further fulfills the foregoing needs by providing in another aspect thereof, a method for detecting faults indicative of an electrical open condition in a respective one of a plurality of power devices of a propulsion system. The plurality of power devices is connectable in parallel circuit through a direct current (DC) link to an external DC power source. The method allows to determine the occurrence of high current events based on whether the value of DC link current is above a predefined current threshold. The method allows to monitor temperature of each power device connected to the power source and ambient temperature. The method allows to relate temperature of each power device to ambient temperature to determine the occurrence of the electrical open condition based on whether the difference between any respective power device temperature and ambient temperature remains within a predefined range during the high current event.

In yet another aspect thereof, the invention provides a method for detecting electrical faulty conditions in a plurality of power devices of a propulsion system. The plurality of power devices is connectable in parallel circuit through a direct current (DC) link to an external DC power source. The method provides a first sequence of actions for determining an electrical short condition in at least one of the power devices upon the power source being connected. The method further provides a second sequence of actions for determining an electrical open condition in a respective one of the plurality of power devices during the occurrence of high current events.

Figure 1:
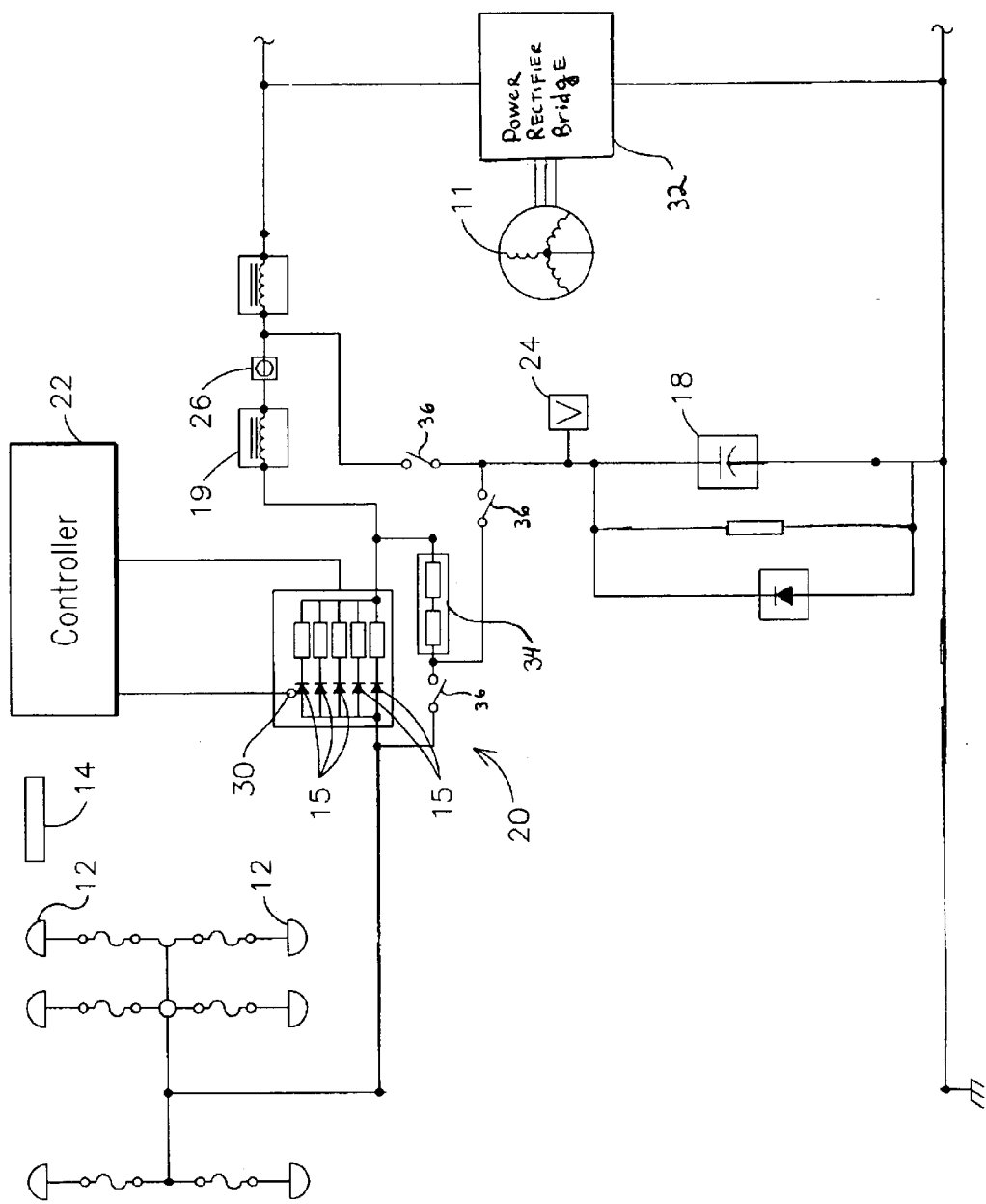
FIG. 1 illustrates a schematic of an exemplary power circuit including a plurality of solid state power devices, e.g., SCRs or thrystors, etc., that may benefit from the fault detection techniques of the present invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIG. 1 illustrates a schematic of an exemplary power circuit used in a locomotive, e.g., a dual mode locomotive. That is, a locomotive that is able to operate in an electrical mode or in an internal combustion mode, e.g., a traction alternator 11 is coupled to receive mechanical power from an internal combustion engine (not shown) to generate electrical power onboard the locomotive after appropriate conversion to DC power in a power rectifier bridge 32. It will be appreciated that the techniques of the present invention are not limited to locomotives, much less dual mode locomotives, since such techniques may be readily used in any vehicle that includes an electrically-powered propulsion system.

As shown in FIG. 1, in the electrical mode, a plurality of shoes 12 allows to receive electrical power from an external power source, represented by a power rail 14. As further shown in FIG. 1, a plurality of power devices, such as SCRs or thrystors 15, is coupled in parallel circuit to a power line filter including reactor devices such as a bank of capacitors represented by capacitor 18 and an inductor 19. As will be readily understood by one of ordinary skill in the art, SCRs are used extensively in power electronics circuits. SCRs are three terminal devices generally operated as bistable switches, operating from nonconducting state to conducting state in response to a gating signal. Once the SCR conducts, it behaves like a conducting diode and there is no gating control over the device. See Chapter 4 of textbook titled "Power Electronics —Circuits Devices and Applications—" by Muhammad H. Rashid 2nd Ed. 1993, published by Prentice-Hall, Inc., for readers who desire further background information regarding the operation of SCR power devices. The power line filter is used to filter power line voltage supplied to the propulsion system to remove electrical transients and noise that could degrade the performance of the propulsion system. Power line filter capacitor 18 generally charges to line voltage upon transitioning into the power rail mode. The charging of the line filter capacitor is generally controlled by a rail filter charge contactor circuit 20 (RFCC) in response to control signals from a controller 22 to avoid potentially detrimental large power surges when the power rail engages one or more of the shoes 12. The RFCC 20 may comprise a resistive load 34 in circuit with power line filter 18 through one or more switches 36 in a manner well understood by those skilled in the art. In one aspect of the present invention, a method for detecting electrical faulty conditions in the plurality of power devices 15 is provided. In its broadest aspect, the method comprises a first sequence of actions for determining an electrical short condition in at least one of the power devices (e.g., SCRs 15) upon the power source (e.g., power rail 14) being connected. The method further comprises a second sequence of actions for determining an electrical open condition in a respective one of the plurality of power devices during the occurrence of high current events.

Figure 2:
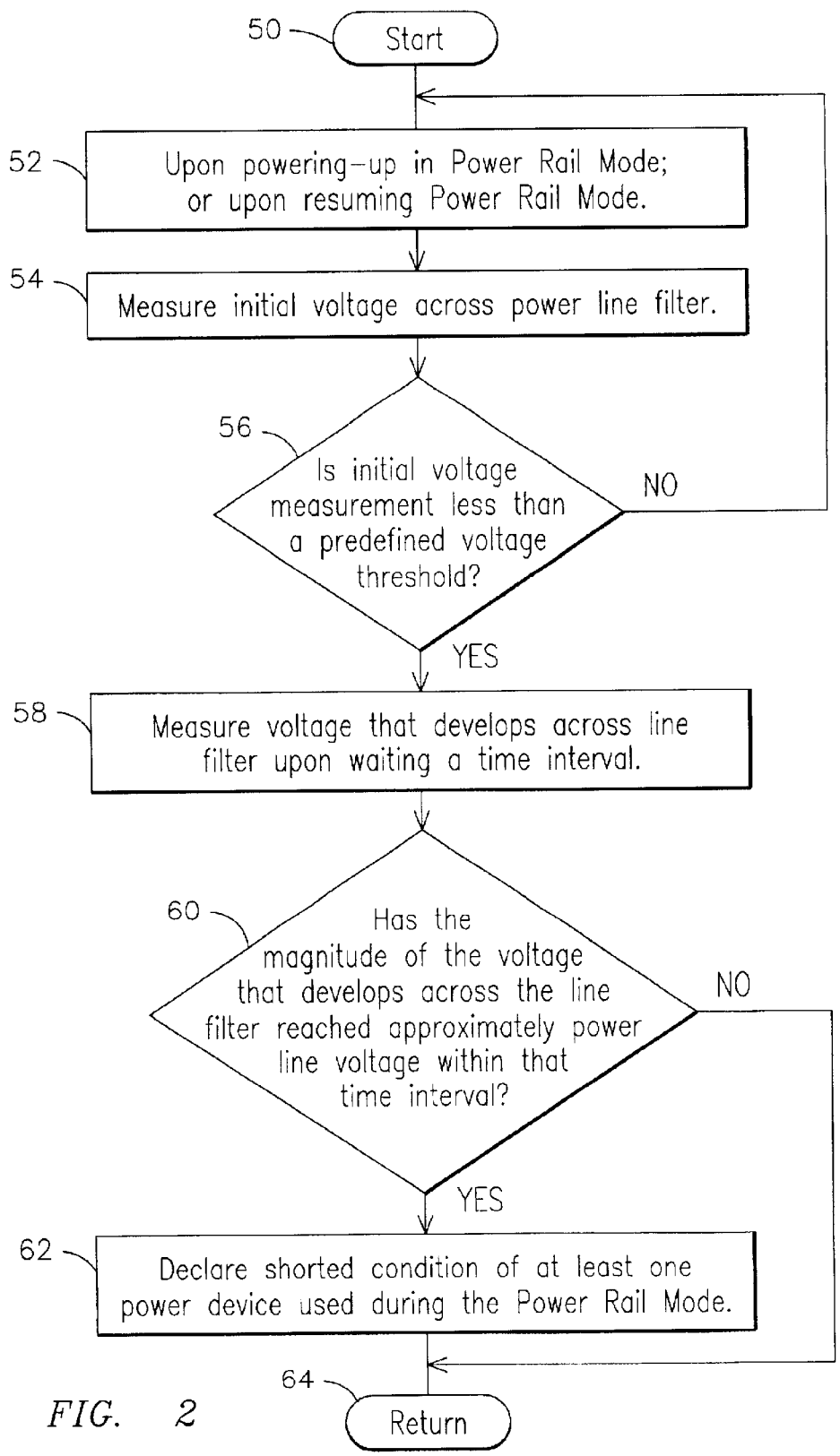
FIG. 2 illustrates a flow chart of an exemplary first sequence of actions for determining an electrical short condition in at least one of the power devices upon an external power source being connected.

FIG. 2 illustrates a flow chart of an exemplary first sequence of actions for determining an electrical short condition in at least one of the power devices upon the power source being connected. Subsequent to start 50, as shown at block 52, e.g., upon powering up in the power rail mode, or upon resuming power rail mode, such as may occur after a physical gap in the power rail ends, block 54 allows to measure initial voltage across power line filter capacitor 18 (FIG. 1) using any suitable voltage measuring device 24 (FIG. 1) or indirect voltage measurement technique, e.g., V=IxR. As shown at block 56, the sequence continues at block 58 if the value of the initial voltage measurement is less than a predefined voltage threshold, otherwise the sequence returns to block 52. Block 58 allows to measure voltage that develops across power line filter capacitor 18 upon waiting a suitable time interval. Decision block 60 allows to determine the presence of the electrical short condition in at least one the rectifiers 15 (FIG. 1) based on whether the magnitude of the voltage developed across the line filter rises to about power line voltage within the time interval. This follows since the presence of an electrical short would affect the charging time of the power line filter. That is, the charging time of the power line filter would be reduced in the presence of an electrical short. Generally, the time interval is selected to be sufficiently short to avoid damage to the propulsion system, and sufficiently long relative to the time constant of the filter to enable filter voltage to rise to about line voltage. In one exemplary embodiment, the time interval is about 100 msec and the power line voltage is about 700 V. It will be appreciated that the specific value of the time interval may vary depending on the specific characteristics of the components of the power line filter. Block 62 allows to declare an electrical short condition in at least one of power devices 15 (FIG. 1) used during the power rail mode when the magnitude of the voltage developed across the line filter rises to about power line voltage within the time interval. Conversely, if the magnitude of the voltage developed across the line filter does not rise to about power line voltage within the time interval, no electrical short condition is declared prior to return 64.

Figure 3:
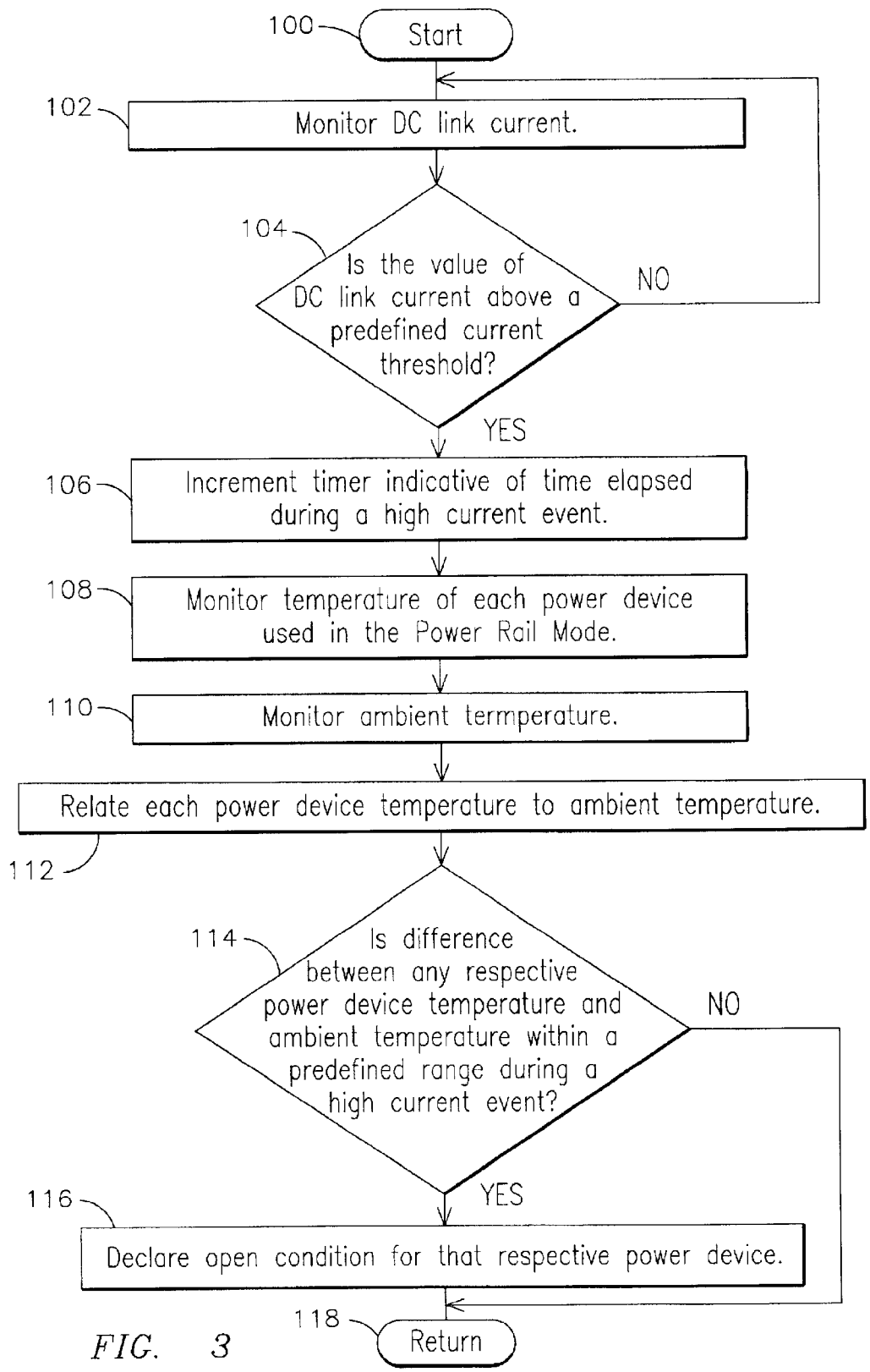
FIG. 3 illustrates a flow chart of an exemplary second sequence of actions for determining an electrical open condition in a respective one of the plurality of power devices during the occurrence of high current events.

FIG. 3 illustrates a flow chart of an exemplary second sequence of actions for determining an electrical open condition in a respective one of the plurality of power devices 15 (FIG. 1) during the occurrence of high current events. As used herein, high current events refer to events where the magnitude of the current through a power device over a period of time is sufficient to generate measurable changes in temperature of the power device relative to ambient temperature. Subsequent to start 100, block 102 allows to monitor DC link current using any suitable current measuring device 26 (FIG. 1), or indirect current measurement technique, e.g., I=V/R. Decision block 104 allows to determine the occurrence of high current events based on whether or not the value of DC link current is above a predefined current threshold. As shown at block 106, a timer may be used to further characterize a high current event by accumulating time elapsed during the high current event. Block 108 allows to monitor temperature of each power device used in the power rail mode. For example, a respective thermocouple, such as a thermocouple 30 (FIG. 1) may be mounted onto each SCR 15 (FIG. 1), or may be integrally constructed as part of the SCR. Block 110 allows to monitor ambient temperature, e.g., cooling air blown onto each SCR 15. Block 112 allows to relate temperature of each power device to ambient temperature to determine in decision block 114 the occurrence of the electrical open condition based on whether the difference between any respective power device temperature and ambient temperature remains within a predefined range during the high current event. For example, when the difference between any respective power device temperature and ambient temperature remains within a predefined range during the high current event, then block 116 allows to declare an open condition for that device. The above determination is possible since during the high current event, each conducting SCR will have a temperature relatively higher than a non-conducting SCR. The ambient temperature information allows to account for situations where temperature changes of the power device may be due to environmental conditions, as opposed to electrical malfunctions of the device. Conversely, when the difference between any respective power device temperature and ambient temperature exceeds the predefined range during the high current event, then no open condition will be declared prior to return 118.

Figure 4:
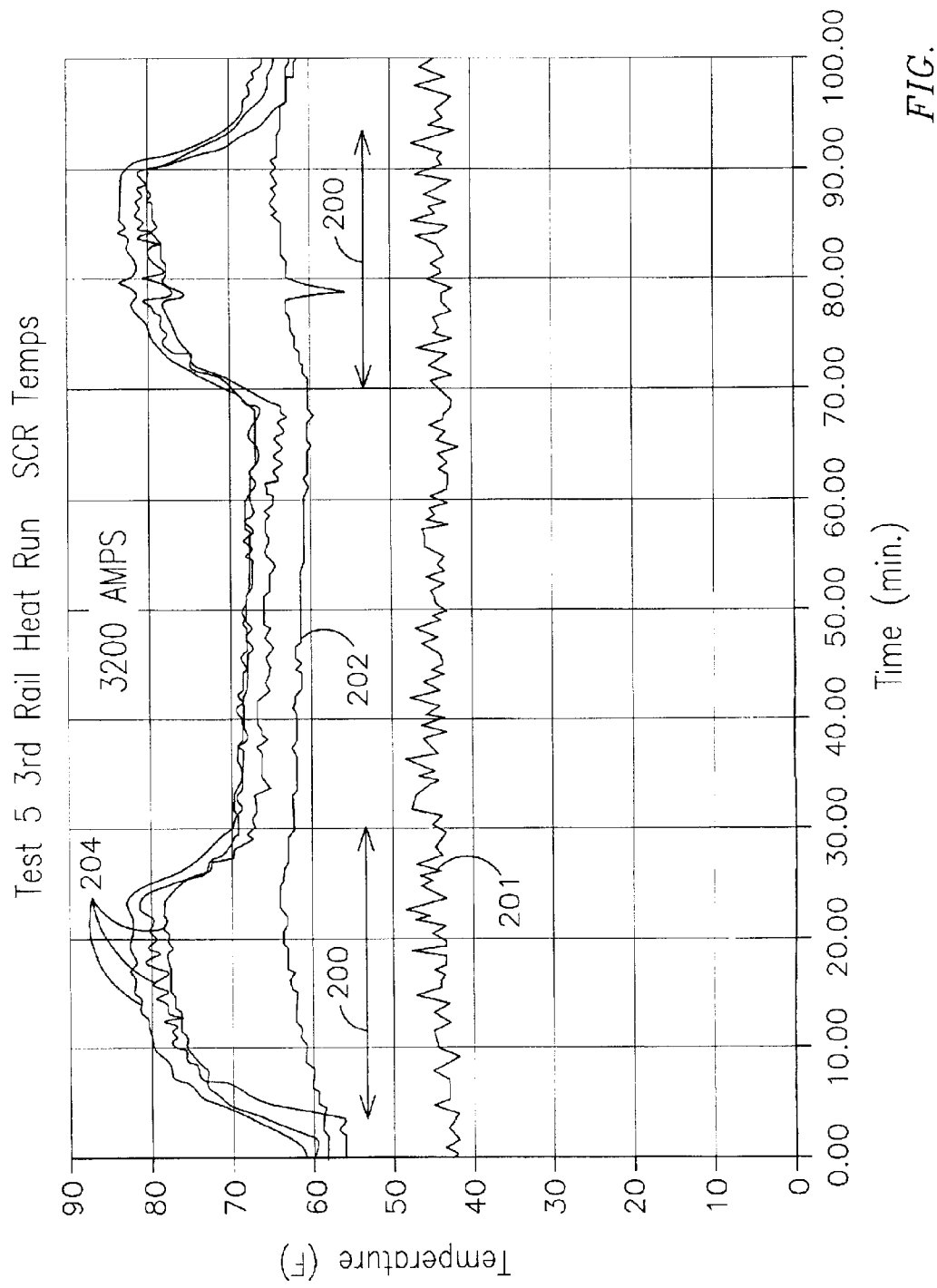
FIG. 4 illustrates respective exemplary plots of temperature of a malfunctioning power device stuck in an electrically open condition, and respective temperatures of three operational power devices, each temperature plotted as a function of time during high current events and compared to ambient temperature.

FIG. 4 illustrates respective plots of temperature as a function of time during high current events 200. Signal 201 corresponds to a temperature signal indicative of ambient temperature. Signal 202 corresponds to a temperature signal indicative of temperature of an SCR stuck in a faulty electrical open condition. That is, such SCR fails to conduct current during the high current event and consequently remains cooler than a conducting SCR. For example, respective signals 204 correspond to temperature signals of three conducting SCRs. That is, such SCRs is each operating in a forward bias mode during the high current condition. It will be noted that the respective temperature values of the three non-defective SCRs generally track each other during the high current events. Also the temperature difference between conducting SCRs and ambient temperature is larger than the initial temperature difference between a non-conducting SCR and ambient temperature. It will be appreciated that controller 22 may be configured to store in a suitable look-up table calibrated SCR temperature curves indicative of the number of SCRs stuck in an electrically open condition. For example, assuming a total of five SCRs and further assuming that two SCRs remain in a faulty electrical open condition, this would result in three SCRs conducting the current normally carried by five SCRs and thus the temperature increase on the three conducting SCRs would be greater than would be the case if a single SCR had failed. This capability may be useful, since, depending on the number of failed components, the system may be forced to be shut off, as opposed to continue operation in a diminished capacity.

The present invention can be embodied in the form of computer-implemented processes and apparatus for practicing those processes. The present invention can also be embodied in the form of computer program code including computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. When implemented on a computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for detecting, during normal operation of a locomotive and without interrupting said locomotive operation, faults indicative of an electrical short condition in at least one power device of a plurality of power devices of a propulsion system of said locomotive, said plurality of power devices connected in parallel circuit to an external direct current power source operationally coupled for electrically powering said propulsion system as the locomotive travels along a rail track proximate said external power source, the method comprising:

upon said power source being electrically connected to the locomotive propulsion system when the locomotive is on said rail track proximate said external power source, measuring an initial voltage across a power line filter in a circuit with the power devices;

measuring voltage developed across said line filter upon waiting a predefined transient time interval; and determining the presence of an electrical short condition in at least one of the power devices based on whether the magnitude of the voltage developed across the line filter rises to about power line voltage within said predefined transient time interval, wherein said time interval is sufficiently short to avoid interrupting said locomotive operation, and to avoid damage to the propulsion system in the event said electrical short condition is actually present, and further wherein said time interval is sufficiently long relative to the time constant of the filter to enable said voltage to rise to about line voltage when a short condition exists.

2. The method of claim 1 wherein said measuring of initial voltage is performed upon initialization of an electrical mode of operation of the locomotive propulsion system through a power rail.

3. The method of claim 2 wherein said action of measuring initial voltage is performed upon resumption of said electrical mode of operation through said power rail.

4. A method for detecting, during normal operation of a locomotive and without interrupting said locomotive operation, faults indicative of an electrical open condition in at least one of a plurality of power devices of a propulsion system of said locomotive, said plurality of power devices connectable in parallel circuit through a direct current (DC) link to an external DC power source operationally coupled for electrically powering said propulsion system as the locomotive travels along a rail track proximate said external power source, the method comprising:

determining the occurrence of a high current events based on whether the value of DC link current is above a predefined current threshold;

monitoring temperature of each power device connected in parallel circuit to the power source;

relating temperature of each power device to the other device to determine the occurrence of said electrical open condition based on whether a temperature difference for any respective power device exceeds a predefined limit relative to the other devices.

5. The method of claim 4 wherein said high current event is further determined based on time elapsed while the value of said DC link current is above said predefined current threshold.

6. A method for detecting, during normal operation of a locomotive and without interrupting said locomotive operation, electrical faulty conditions in at least one of a plurality of power devices of a propulsion system of said locomotive, said plurality of power devices connected in parallel circuit through a direct current (DC) link to an external DC power source operationally coupled for electrically powering said propulsion system as the locomotive travels along a rail track proximate said external power source, the method comprising:

a first sequence of actions for determining an electrical short condition in at least one of said power devices upon said power source being electrically connected to the locomotive propulsion system when the locomotive is on said rail track proximate said external power source, wherein said first sequence of actions is performed within a predefined transient time interval being sufficiently short to avoid interrupting said locomotive operation, and avoiding damage to the propulsion system in the event said electrical short condition is actually present; and a second sequence of actions for determining an electrical open condition in at least one of said plurality of power devices during the occurrence of a high current events.

7. The method of claim 6, wherein said first sequence comprises:

measuring an initial voltage across a power line filter;

measuring voltage developed across said line filter upon waiting a time interval; and determining the presence of said electrical short condition in said at least one power device based on whether the magnitude of the voltage developed across the line filter rises to about power line voltage within said time interval.

8. The method of claim 6, wherein said second sequence comprises:

determining the occurrence of said high current events based on whether the value of DC link current is above a predefined current threshold, said determining action further based on time elapsed while the value of said DC current link is above said predefined current threshold;

monitoring temperature of each power device connected to the power source;

relating temperature of each power device to the other devices to determine the occurrence of said electrical open condition based on whether a temperature difference between any respective power device exceeds a predefined limit relative to the other devices.

9. The method of claim 4 further comprising monitoring ambient temperature conditions for the power devices and considering the ambient conditions to determine the occurrence of said electrical open condition.

\* \* \* \* \*